United States Patent
Smith et al.

(10) Patent No.: US 11,154,737 B2
(45) Date of Patent: Oct. 26, 2021

(54) FLAME RETARDANT POROUS PLASTIC RESINS

(71) Applicant: M.A. Industries, Inc., Peachtree City, GA (US)

(72) Inventors: Michael W. Smith, Sharpsburg, GA (US); Delores Sewell, Newnan, GA (US); Thomas Fleming, Peachtree City, GA (US)

(73) Assignee: M.A. INDUSTRIES, INC., Peachtree City, GA (US)

( * ) Notice: Subject to any disclaimer, the term of this patent is extended or adjusted under 35 U.S.C. 154(b) by 110 days.

(21) Appl. No.: 15/533,366

(22) PCT Filed: Dec. 7, 2015

(86) PCT No.: PCT/US2015/064296
§ 371 (c)(1),
(2) Date: Jun. 5, 2017

(87) PCT Pub. No.: WO2016/090367
PCT Pub. Date: Jun. 9, 2016

(65) Prior Publication Data
US 2017/0368392 A1 Dec. 28, 2017

Related U.S. Application Data

(60) Provisional application No. 62/088,079, filed on Dec. 5, 2014.

(51) Int. Cl.
*A62C 3/16* (2006.01)
*C08J 9/24* (2006.01)
*A62C 4/00* (2006.01)
*H01M 50/383* (2021.01)
*H01M 50/30* (2021.01)

(52) U.S. Cl.
CPC ............ *A62C 3/16* (2013.01); *A62C 4/00* (2013.01); *C08J 9/24* (2013.01); *H01M 50/383* (2021.01); *H01M 50/394* (2021.01); *C08J 2201/026* (2013.01); *C08J 2205/044* (2013.01); *C08J 2207/00* (2013.01); *C08J 2323/06* (2013.01)

(58) Field of Classification Search
None
See application file for complete search history.

(56) References Cited

U.S. PATENT DOCUMENTS

| | | |
|---|---|---|
| 3,709,806 A | 1/1973 | Minami et al. |
| 5,721,281 A | 2/1998 | Blount |
| 2004/0132854 A1* | 7/2004 | Du Plessis ............... C08J 3/244 522/114 |
| 2006/0177729 A1 | 8/2006 | Campau |
| 2008/0176994 A1 | 7/2008 | Allermann et al. |

FOREIGN PATENT DOCUMENTS

| | | |
|---|---|---|
| JP | 2000026644 A | 1/2000 |
| WO | 2013/159942 A2 | 10/2013 |

OTHER PUBLICATIONS

International Search Report in related International PCT Application No. PCT/US2015/064296, dated Apr. 1, 2016, 4 pages.
Written Opinion in related International PCT Application No. PCT/US2015/064296, dated Apr. 1, 2016, 5 pages.

* cited by examiner

*Primary Examiner* — Robert T Butcher
(74) *Attorney, Agent, or Firm* — Kilpatrick Townsend & Stockton LLP

(57) ABSTRACT

Described are flame retardant, porous plastic flame arrestors. The flame retardant, porous plastic flame arrestor is formed by irradiating a flame retardant polymer resin to achieve a fractional melt index, grinding the flame retardant polymer resin into a powder, and sintering the flame retardant polymer resin to form a porous structure. Irradiating the flame retardant polymer resin increases the resin's molecular weight and reduces the resin's melt index through crosslinking.

8 Claims, 7 Drawing Sheets

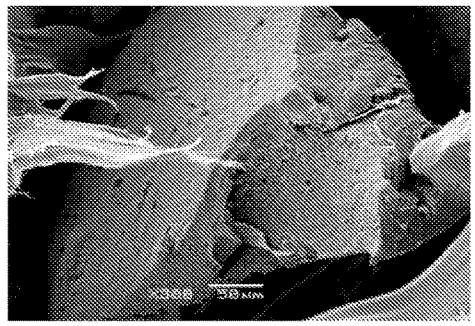
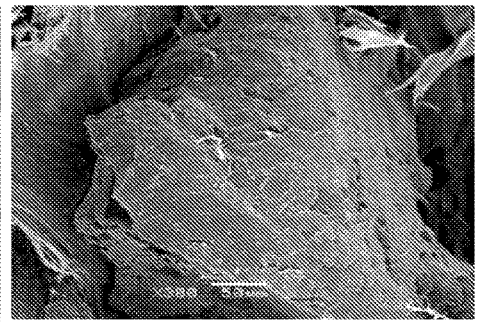
FIG. 2A
*Prior Art*
FIG. 2B
*Prior Art*
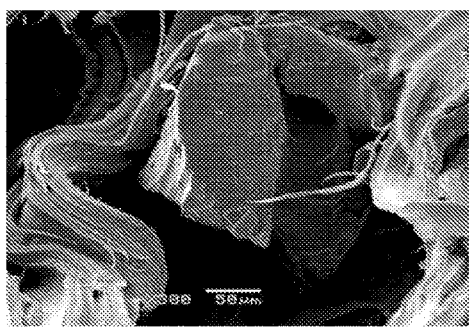
FIG. 2C
*Prior Art*
FIG. 2D
*Prior Art*
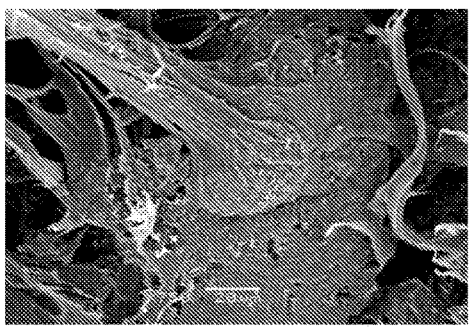
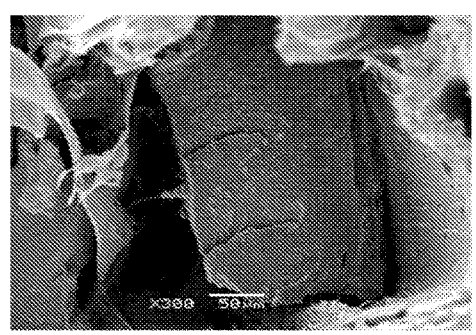
FIG. 2E
*Prior Art*
FIG. 2F
*Prior Art*

0.9 g/10 min Melt Flow     0.1 g/10 min Melt Flow 0.9 g/10 min Melt Flow    0.1 g/10 min Melt Flow

FLAME RETARDANT POROUS PLASTIC RESINS

CROSS-REFERENCE TO RELATED APPLICATION

This application is the U.S. national phase of International Application No. PCT/US2015/064296 ("the '296 application") filed on Dec. 7, 2015, and published on Jun. 6, 2016 as International Publication No. WO 2016/090367 A1, which is related to and claims priority benefits from U.S. Provisional Application Ser. No. 62/088,079 ("the '079 application"), filed on Dec. 5, 2014, entitled "FLAME RETARDANT POROUS PLASTIC RESINS." The '296 application and the '079 application are hereby incorporated in their entireties by this reference.

FIELD OF THE INVENTION

The present invention is directed to the field of flame arrestors or battery vents, and particularly for such applications where the flame arrestors or battery vents are required to meet UL flame retardant guidelines.

BACKGROUND

Lead/acid batteries typically generate hydrogen and oxygen during charging. These gases must be vented out; otherwise internal pressure can build to the point of rupturing the battery case, permitting the acid to escape and damage surrounding equipment as well as ruining the battery.

The mixture of these gases is highly explosive and will readily ignite if exposed to an ignition source. As a result, the gases are typically vented out through a porous media designed to prevent any ignited gases from propagating back into the battery. If such propagation occurs, the result will be an explosion that can damage surrounding equipment and seriously injure individuals within close proximity or the surrounding vicinity.

In many cases, porous structures are widely used to vent these gases from the battery and are called either "flame arrestors" or "battery vents." In certain cases, these porous structures may be formed from porous plastic materials or porous ceramic materials.

The term "porous plastic" generally refers to structures comprising particles of thermoplastic or thermoset polymers physically bonded to adjacent particles, with the resulting omnidirectional, interconnected spaces between particles comprising a flow path for fluids. The particles can range in size from about 30 microns to 600 microns, yielding pore diameters from 10 microns to about 250 microns. The flow path of porous plastics is said to be "torturous."

Porous plastic flame arrestors typically comprise molded structures having average pore sizes ranging from about 50 microns to about 200 microns. Different battery manufacturers have different specifications on flow rates, resulting in the need to run different average pore sizes.

Porous plastic parts may be made using fractional melt polymer resins. The term "fractional melt" typically refers to any polymer with a melt flow less than 1.0 gram/10 minutes, and the term "melt flow" typically refers to how much a polymer will physically flow under pressure in a melted condition. There are standard tests wherein the polymer is heated to a specified temperature then subjected to a specified pressure and thereby forced through an orifice of specified diameter. These results are usually reported in grams of material forced through the orifice over a specified period of time. So a reported melt flow of, say, "25" means 25 grams of the polymer came through the orifice in 10 minutes. The number 25 in this case would be called the "melt index" of the polymer. A description of such testing protocol may be found in ASTM D1238-10.

These fractional melt polymer resins are converted into porous plastics via a process typically referred to as "sintering." Porous plastic sintering is the process of forming a porous mass of material by heat and/or pressure without melting it to the point of liquefaction. In basic terms, the process is relatively simple.

The raw plastic materials are often initially in the form of a fine particle powder or a somewhat larger particle flake, both of which are difficult to work with. Specifically, these forms typically have relatively poor dry flow characteristics and are prone to "bridging," "clumping," "clinging," etc. in the material feed hoppers typically found on plastics processing equipment. To improve handling, most polymers are put through a thermal process in which they are melted and forced through small openings in a die mounted to the exit of an extruder. Upon exiting, they are cut by a rapidly rotating cutter into small, semi-spherical or semi-rod shaped structures which, when cooled by water back to a solid form, are called "pellets." The pellet size is generally on the order of 0.150"-0.220" in diameter with a similar length for rod shapes or with similar diameters and thickness on the order of 0.050"-0.100" for spherical shapes. In this form, the dry flow properties are far better, and the materials are far easier to handle. The majority of commercially available polymers are sold in pellet form, as shown in FIG. 1.

Since the raw material for the sintering process needs to be in powder (not pellet) form, there are, essentially, two ways of obtaining the powdered polymer. In some cases, the pelletizing process described above is skipped and the material is sold in the same powder form it comes out of the reactor. Only a few polymers are available this way. In other cases, it is necessary to mechanically grind the pellet to produce the desired size particles.

Either way, the particles obtained are generally irregular in shape, in many cases highly irregular. The images shown in FIGS. 2a-2f, 3, and 4 give an idea, at different magnifications, of just how irregular these particle shapes can be.

The powder is then put into cavities that have been machined into a mold. The mold is heated to a temperature of anywhere from 290° F. to 600° F. and remains at that temperature anywhere from 1 minute to 20 minutes, depending on part size, the particular polymer being used, etc. The mold, in turn, heats the powder in the cavity. The objective is to get the particles of the powder to a temperature where they become "tacky" or "sticky" and can form bonds with adjacent particles. The mold is then cooled, which cools the powder and produces a porous part that reflects the shape of the cavity.

The heating and cooling of the mold can be accomplished by any of several methods well-known to those in the porous plastics business. The mold may have internal channels through which hot heat transfer fluid is passed to heat the mold, followed by introduction of cooling water. Or, alternatively, the mold may be clamped under pressure between heated metal plates, followed by clamping between cooled metal plates. In certain cases, convective heating and cooling may be used.

When such irregularly-shaped particles (as described above) are heated to their melt point, three possibilities tend to occur: the particles try to assume a more spherical shape, because doing so minimizes the particle's total surface energy; smaller particles (especially the long, very small diameter "hairs" seen attached to some particles in pictures "a" through "f" above) tend to coalesce into larger, adjacent particles because that also tends to minimize the total surface energy; and/or the particle-to-particle pressure generated by the thermal expansion of the powder constrained in the cavity causes the particles to bond to one another, i.e. to intermingle at the molecular level.

With a melt index above 1.0, these phenomena yield a part that is distorted and disfigured, with areas of non-uniform porosity or even no porosity. In fact, if the melt flow value is high enough, what will be left in the cavity after the mold is cooled is a solidified puddle of polymer in the bottom of the cavity.

In most cases, fractional melt powders are therefore necessary to allow the fusing of the individual particles together to create a porous structure inherent in porous plastic molded parts, particularly as non-fractional melt resin powders melt and flow, which eliminates the porous structure. These fractional melt polymers are, however, highly flammable.

In contrast to porous plastic flame arrestors, porous ceramic flame arrestors were once widely used in automotive applications, but fell of favor in the automotive battery industry due to cracking problems during assembly and the general difficulty of achieving a reliable plastic-ceramic seal.

After shifting away from porous ceramic flame arrestors, automotive battery manufacturers began producing porous plastic flame arrestors made from fractional melt polypropylene, which has somewhat better thermal resistance properties than, say, fractional melt polyethylene. The need for better thermal resistance properties in the automotive battery field is driven by demanding under-the-hood temperatures, which must be withstood by the porous plastic flame arrestors without melting.

In contrast to the automotive battery industry segment, a non-automotive battery market still uses the porous ceramic flame arrestors. These batteries serve as back-up power supplies for large server farms and other installations where downtime due to power failures is intolerable. These batteries are installed indoors and, in keeping with various fire prevention practices, must meet a V0 flame retardant rating. The term "flame retardant" refers to a material that will not support continued combustion after ignition by an external flame source, as defined and tested against standards published by Underwriters Laboratories. Such materials are said to "self-extinguish".

In general, a wide variety of polymers, such as high density polyethylene (HDPE), low density polyethylene (LDPE), polypropylene (PP), polyurethane etc., may be rendered flame retardant via the addition of certain minerals, organohalogens, phosphonates, organophosphates, etc.

For example, flame retardant plastic resins are physically mixed in with the polymer by introducing them into the pellet-creating stage, as described above. This addition may occur when the pellet is first created from the just-polymerized polymer or may be accomplished by "re-pelletizing" an existing pellet. As a rule, polymers with melt flow index values well above 1.0 can be easily processed in this fashion. Hence, the commercially available, flame retardant polymers generally encountered on the market have high melt flow indices, well above 1.0.

Polymers with melt index values below 1.0 are more difficult and more expensive to pelletize, the greater expense resulting from the lower throughput rates that the low melt index yields. As a result, such flame retardant materials have not been incorporated into the fractional melt polymers used to form the porous plastic flame arrestors for the automotive battery industry, which is why these flammable porous plastic flame arrestors have not been used in the non-automotive applications where certain flame retardant standards must be met.

There have been attempts to create a flame retardant porous plastic by coating the cell walls with a flame retardant mixture, such as the product described in U.S. Pat. No. 5,721,281, but this is a slow and expensive process that requires secondary processing and removal of the solvents or water carrier.

As a result, it may be desirable to provide porous plastic flame arrestors having a V0 flame retardant rating for use in non-automotive battery applications.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Certain embodiments of the present invention comprise a flame retardant, porous plastic flame arrestor. Some embodiments comprise a blend of the flame retardant, porous plastic flame arrestor and at least one traditional fractional melt resins, wherein the flame retardant, porous plastic flame arrestor is present in ratios of 100%-10%.

In certain embodiments, the flame retardant, porous plastic flame arrestor may be formed by irradiating a flame retardant polymer resin to achieve a fractional melt index, grinding the flame retardant polymer resin into a powder, and sintering the flame retardant polymer resin to form a porous structure.

In further embodiments, the flame retardant polymer resin is polyethylene, polyvinyl chloride, a fluoropolymer, a polymer resin, or combinations thereof.

In some embodiments, irradiating the flame retardant polymer resin increases the resin's molecular weight and reduces the resin's melt index through crosslinking.

According to certain embodiments of the present invention, a method of forming a fractional melt, flame retardant resin comprises crosslinking a polymer structure of a high melt flow flame retardant resin. The method may further comprise grinding the high melt flow flame retardant resin.

In certain embodiments, the high melt flow flame retardant resin is configured to produce a sintered porous plastic flame retardant material that meets UL flammability standards for plastic resins.

The method may further comprise producing a sintered porous plastic part in processing conditions that meet UL flammability test standards.

In certain embodiments, crosslinking the polymer structure of the high melt flow flame retardant resin comprises applying an electron beam process, a chemical process, or other irradiated processes to the high melt flow flame retardant resin.

The high melt flow flame retardant resin may be polyethylene, polyvinyl chloride, a fluoropolymer, a polymer resin, or combinations thereof.

In further embodiments, crosslinking the polymer structure of the high melt flow flame retardant resin comprises applying an electron beam process to a flame retardant low density polyethylene.

In some embodiments, the fractional melt, flame retardant resin has a fractional melt of approximately 0.1 g/10 min. The fractional melt, flame retardant resin may further have a fractional melt of approximately 0.9 g/10 min. The fractional melt, flame retardant resin may further have a fractional melt between approximately 0.01-0.99 g/10 min.

According to certain embodiments of the present invention, a porous plastic part is produced by converting a flame retardant resin to a fractional melt material and sintering the fractional melt material.

BRIEF DESCRIPTION OF THE DRAWINGS

FIGS. 2A-2F, 3 and 4 are images showing the irregularity of particle sizes found in commercially available powdered pellets at different magnifications.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

According to certain embodiments of the present invention, fractional melt resin based polymers such as high density polyethylene ("HDPE"), ultra high molecular weight polyethylene ("UHMW"), polyvinyl chloride ("PVC"), fluoropolymers ("PTFE") and other crosslinking thermoplastic materials are made flame retardant to meet UL 94 flammability standards in sintered porous plastic molded parts.

The process starts with a standard high melt flow flame retardant polyethylene resin and through electron beam radiation, chemical additives or other irradiation methods crosslinks the polymer and converts it to a fractional melt resin capable of being sintered in a standard porous plastic molding cycle. This sintered porous plastic part is then capable of passing the UL 94 V0 flammability test for plastic molded parts.

In certain embodiments, rather than using the conventional methods to heat the mold during sintering as described in the background section above, the powder could be heated directly, by, for instance, a microwave field. This would require blending in an additive that responds to radio frequency ("RF") energy, inasmuch as the polymers commonly used in porous plastics do not. Furthermore, the mold may need to be formed from a material that does not interfere with the RF field, such as glass.

In certain embodiments, electron beam irradiation reduces melt index by growing the effective molecular weight. This growth in molecular weight is accomplished either through chain branching, wherein one molecular chain bonds to an adjacent chain somewhere between the ends of the molecule, thereby creating a more or less "Y" shaped molecule, or by chain crosslinking, wherein two independent polymer chains become linked by a third chain, thereby creating a more or less "H" shaped molecule. Either shape would offer greater resistance to flow than a simple uniform molecular chain. Varying degrees of both are possible depending on dose.

Such an approach may not be feasible for use with a polypropylene-based flame retardant polymer, wherein ionizing radiation has the opposite effect on polypropylene, causing molecular chain scission and an increase in melt flow. Likewise, this approach may not be feasible with other chemicals or additives where ionizing radiation results molecular growth.

Figure 1:
FIG. 1 is an image of commercially available polymers in pellet form.
Figure 3:
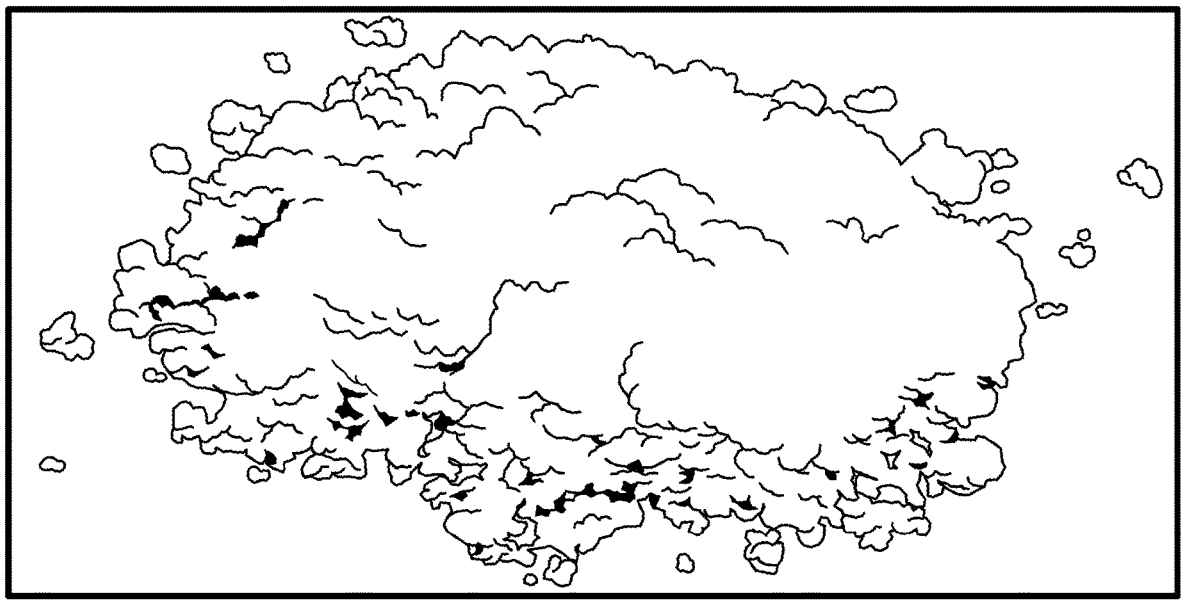
Figure 4:
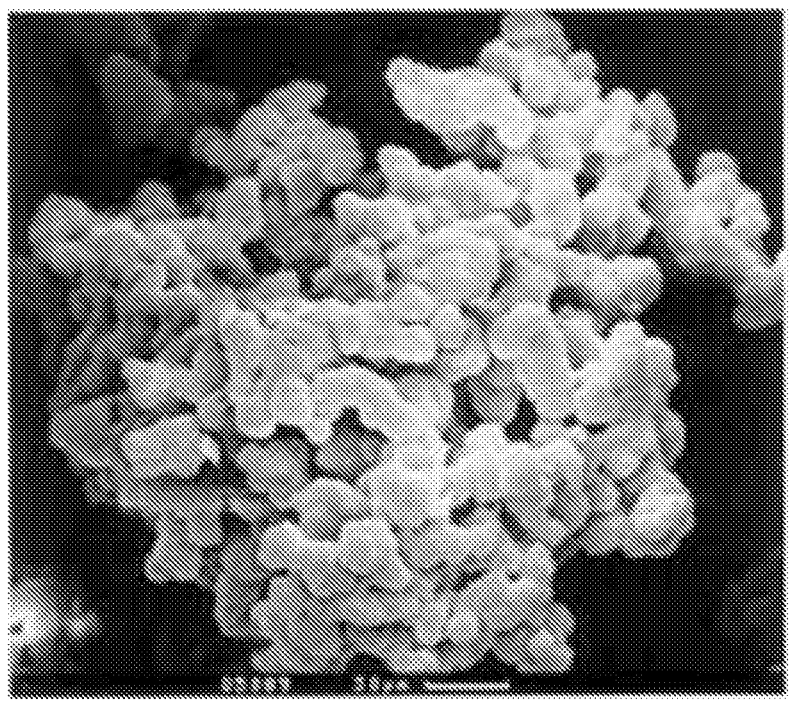
Figure 5:
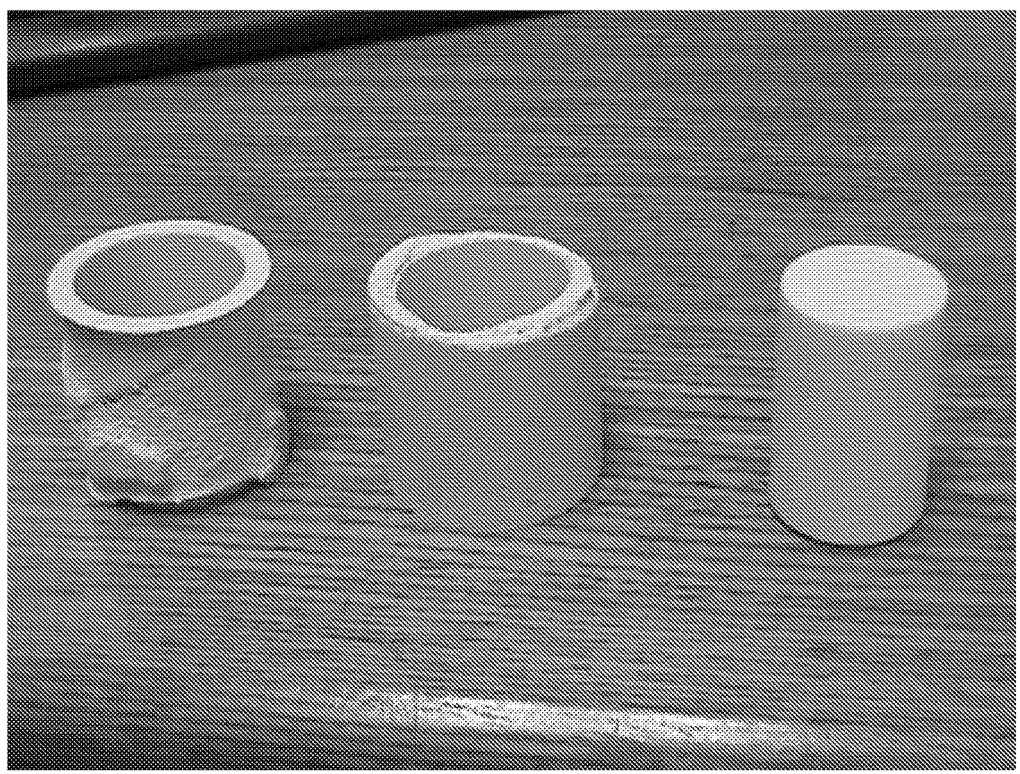
FIG. 5 is an image of a part formed from a flame retardant polyethylene with a melt index of 3.0, ground from a pellet to a powder and not irradiated (left), a part formed from a flame retardant polyethylene with a melt index of 3.0, ground from a pellet to a powder and irradiated to a melt flow of 0.9 to 1.1 (middle), and a part formed from ultra-high molecular weight polyethylene, for which the molecular weight is so high its melt index is 0 (right), according to certain embodiments of the present invention.

In FIG. 4, the part on the far left was molded from a flame retardant polyethylene with a melt index of 3.0, ground from a pellet to a powder and not irradiated. The part in the middle was molded from the same powder but irradiated to a melt flow of 0.9 to 1.1. The part on the right is molded from what is called an "ultra-high molecular weight polyethylene," for which the molecular weight is so high its melt index is 0.0. As shown in FIG. 5, as the melt index approaches zero, the material exhibits more predictable behavior. According to certain embodiments, a flame retardant polyethylene with a melt index of 0.1 exhibits the visual appearance of the UHMW part shown on the right.

The differences in the appearances of the visual appearances above may be attributed to the fact that a fractional melt polymer has sufficient viscosity in its molten state to significantly reduce the three effects mentioned in the background section above. In other words, the same melt viscosity that permits less than 1 gram of material to be forced through the test orifice in 10 minutes (tested per the ASTM procedure for melt index determination) also permits the particles to largely retain their starting shape, size etc., avoiding the defects seen above.

In addition to the obvious visual improvement with lower melt flow, the UHMW polyethylene, which has a melt index of 0.0, produces a weaker structure than those made from even a slightly higher melt index, such as a 0.5 melt index PE. Such a result is consistent with what one would expect to happen as the melt index reaches 0.0.

In any event, the evidence demonstrates that use of a flame resistant polymer with fractional melt index produces a cleaner and more predictable sintered product. The fractional melt index for these flame resistant polymer may be between approximately 0.001-0.999 g/10 min, approximately 0.01-0.99 g/10 min, approximately 0.01-0.7 g/10 min, approximately 0.01-0.5 g/10 min, approximately 0.01-0.3 g/10 min, approximately 0.01-0.2 g/10 min, approximately 0.1-0.9 g/10 min, approximately 0.1-0.7 g/10 min, approximately 0.1-0.5 g/10 min, approximately 0.1-0.3 g/10 min, and approximately 0.1-0.2 g/10 min.

In certain embodiments, the fractional melt powder may be processed at loadings from 100%-10% with conventional fractional melt (0.5 g/10 min) high density polyethylene powders, and may be processed at loadings from 95%-5%, at loadings from 80%-20%, at loadings from 95%-80%, at loadings from 20%-5%, at loadings from 60%-40%, at loadings from %70-50%, at loadings from %50-30% (wherein the percentages represent the amount of fractional melt powder included in the blends).

Example 1

A flame retardant LDPE concentrate with a melt flow of 3 g/10 min was ground into a 40 mesh powder using conventional resin grinding equipment. This powder was then cross-linked using an electron beam process to a fractional melt of 0.9 g/10 min. This fractional melt powder was then processed at loadings from 100%-10% with conventional fractional melt (0.5 g/10 min) high density polyethylene powders. These mixtures were then sintered into 7 inch long by 0.67 inch wide by 0.107 inch test bars and a porous plastic flame arrestor filter 1.7 inch outside diameter, 0.62 inch height with a wall thickness of 0.187 inch. This flame arrestor filter size is typical of a ceramic filter used in reserve power batteries employed in data centers for back-up power that are required to meet UL 94 V0 flammability standards. The parts were processed using standard sintering molds and process conditions.

The parts were tested at Applied Technical Services under UL flammability test procedures. The 5 samples of the test bar and molded flame arrestor parts at 100% loading of ground radiated FR LDPE passed the UL 94 V0 test requirement. The 50/50% blend of the FR powder and a standard HDPE resin met the UL 94 V2 test requirements.

Example 2

A second flame retardant LDPE concentrate with a melt flow of 5 g/10 min from a different supplier was ground into a 40 mesh powder using conventional resin grinding equipment. This powder was then cross-linked using the same electron beam process to a fractional melt of 0.1 g/10 min. This fractional melt powder was then processed at loadings from 100%-20% with conventional fractional melt (0.5 g/10 min) high density polyethylene powders. This fractional melt powder was then molded into five samples of the same porous plastic flame arrestor filter 1.7 inch outside diameter, 0.62 inch height with a wall thickness of 0.187 inch. The samples were processed using standard sintering molds and process conditions.

The samples were tested at Applied Technical Services under UL flammability test procedures, and the five tested samples all passed the UL 94 V0 test requirement.

Figure 6:
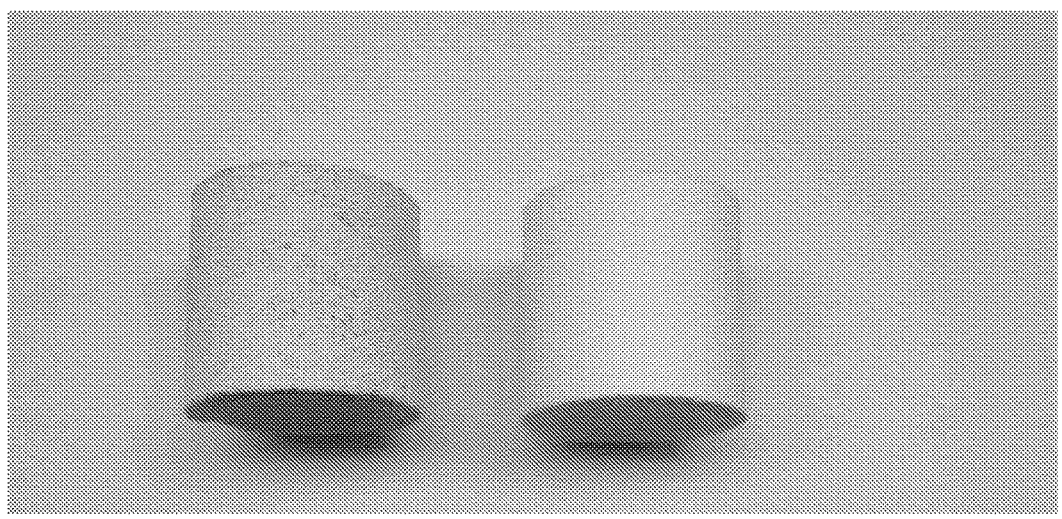
FIG. 6 is an image of a part formed using the process described in Example 1 (left) and a part formed using the process described in Example 2 (right), according to certain embodiments of the present invention.
Figure 7:
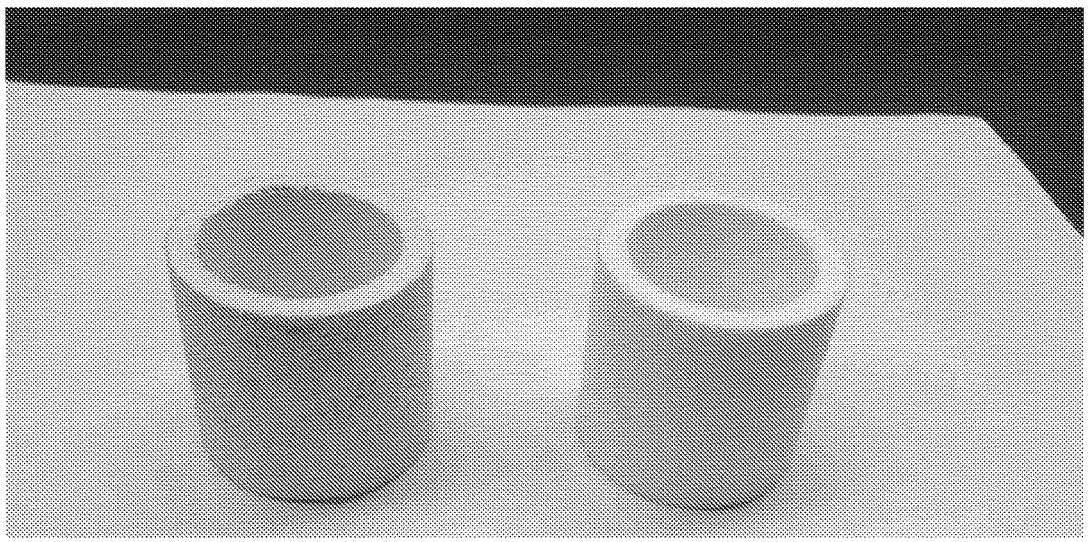
FIG. 7 is another image of the parts shown in FIG. 6.

FIGS. 6 and 7 show parts produced using the process described in Example 1 and Example 2. As can be seen in FIGS. 6 and 7, the lower melt flow achieved with the sample produced using the process described in Example 2 improved the molding of the fractional melt powder, as compared to the molding of the fractional melt powder in the test sample produced using the process described in Example 1.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A method of forming a flame retardant, porous polyethylene flame arrestor, the method comprising:
    combining a polyethylene with at least one of a mineral, an organohalogen, a phosphonate, an organophosphate, or combinations thereof to form a flame retardant polyethylene resin;
    irradiating a flame retardant polyethylene resin to achieve a fractional melt of between 0.01-0.90 g/10 min;
    grinding the flame retardant polyethylene resin into a powder; and
    sintering the flame retardant polyethylene resin to form a porous structure.

2. The flame retardant, porous polyethylene flame arrestor formed by the method of claim 1 comprising polyethylene and at least one of a mineral, an organohalogen, a phosphonate, an organophosphate, or combinations thereof, wherein the polyethylene is rendered flame retardant by the addition of the at least one of a mineral, an organohalogen, a phosphonate, an organophosphate, or combinations thereof, wherein the flame retardant, porous polyethylene flame arrestor has a fractional melt of between 0.01-0.90 g/10 min.

3. The method of claim 1, further comprising producing a sintered porous plastic part in processing conditions to produce a sintered porous plastic part that meets UL 94 flammability test standards.

4. The method of claim 1, wherein irradiating the flame retardant polyethylene resin increases the resin's molecular weight and reduces the polyethylene resin's melt index through crosslinking.

5. The method of claim 4, wherein the crosslinking comprises applying an electron beam process, a chemical process, or other irradiated processes to flame retardant polyethylene resin.

6. The method of claim 4, wherein the crosslinking comprises applying an electron beam process to the flame retardant polyethylene resin, wherein the flame retardant polyethylene resin is a flame retardant low density polyethylene resin.

7. The method of claim 6, wherein the flame retardant polyethylene resin has a fractional melt of approximately 0.1 g/10 min.

8. The method of claim 6, wherein the flame retardant polyethylene resin has a fractional melt of approximately 0.9 g/10 min.

* * * * *